United States Patent
Woznow et al.

Patent Number: 6,035,542
Date of Patent: Mar. 14, 2000

[54] SURFACE PROFILING APPARATUS AND METHOD

[76] Inventors: Leon J. Woznow, 1262 Eastview Road, North Vancouver, British Columbia, Canada, V7J 1L6; Paul O. Toom, 300 Murphy Drive West, Delta, British Columbia, Canada, V4M 3P2

[21] Appl. No.: 08/852,237

[22] Filed: May 6, 1997

[51] Int. Cl.[7] .................................................... G01B 5/25
[52] U.S. Cl. ............................................. 33/533; 33/775
[58] Field of Search ............................. 33/533, 521, 772, 33/773, 775, 779, 780, 781, 782

[56] References Cited

U.S. PATENT DOCUMENTS

| | | |
|---|---|---|
| 4,137,638 | 2/1979 | Watts . |
| 4,741,207 | 5/1988 | Spangler ................................. 33/521 |
| 4,858,329 | 8/1989 | Manor . |
| 5,107,598 | 4/1992 | Woznow et al. . |
| 5,535,143 | 7/1996 | Face . |

OTHER PUBLICATIONS

Article entitled "Product Designs —Trailing wheels record ground condition" from "Product Engineering" dated Jul. 31, 1961, p. 37.

*Primary Examiner*—Bernard Roskoski
*Attorney, Agent, or Firm*—Elbie R. de Kock

[57] ABSTRACT

A surface profiler 10 has a forward support wheel 20, an intermediate support wheel 21 and a rearward support wheel 22 for travelling along a surface, the profile of which is to be measured. The wheels 20, 21, 22 are spaced apart at predetermined distances longitudinally of the direction of travel for travel along substantially the same line along the surface. The profiler 10 further comprises a forward frame member 40 supported by the forward and intermediate support wheels 20, 21 and a rearward frame member 41, supported by the intermediate and rearward support wheels 21, 22. The forward and rearward frame members 40, 41 are pivotally connected together about the rotation axis of the intermediate support wheel 21. Angle measuring means 30 is provided for measuring the relative orientation of the forward and rearward frame members 40, 41 with respect to the rotation axis of the intermediate support wheel 21. The profiling apparatus 10 also includes an inclination measuring means 32 for referencing one of the forward and rearward frame members 40, 41 to a reference position which is independent of the forward and rearward frame members 40, 41, such as the horizonal position. A method of measuring the profile of a surface is also provided.

18 Claims, 6 Drawing Sheets

D=Distance measured along the profile surface at the position of the front wheel when all data (Di, Ai, Ii and Ti) are recorded.

I=Inclination relative to true horizontal.

A=Angle of reference axis of front arm relative to reference axis of rear arm.

T=Temperature of the inclinometer measured inside the inclinometer cabinet.

SURFACE PROFILING APPARATUS AND METHOD

FIELD OF THE INVENTION

This invention relates to an apparatus and method for measuring the profile of a surface, such as an airport runway, highway, raceway, parkade, bridge deck or any other surface requiring determination of roughness or smoothness.

BACKGROUND OF THE INVENTION

Manually operated rolling profiler instruments are emerging into the field of commercial profiling as a viable economic alternative to the cumbersome and labour intensive, as well as slow, rod and level method of survey, including straightedge surveys.

Foremost, profiling of runways, highways, raceways, parkades and bridge decks is required to monitor construction of these structures for conformance with design and traffic safety specifications. Surface profiling of runways and highways is necessary at regular seasonal intervals to determine the roughness value as a measure of pavement deterioration for maintenance purposes.

Previous methods of surface profiling have embodied inherent problems, such as that they are time consuming, cumbersome to operate and susceptible to acceleration and deceleration.

It is an object of the present invention to provide a method and apparatus for relatively easy, quick and accurate measurement of a surface profile, from which roughness or smoothness index values can be computed.

SUMMARY OF THE INVENTION

According to the invention there is provided a surface profiling apparatus having a forward support wheel, an intermediate support wheel and a rearward support wheel for travelling along a surface the profile of which is to be measured, said wheels being spaced apart at predetermined distances longitudinally of the direction of travel for travel along substantially the same line along said surface, and further comprising a forward frame member supported by said forward and intermediate support wheels; a rearward frame member supported by said intermediate and rearward support wheels, the forward and rearward frame members being pivotally connected together about the rotation axis of said intermediate support wheel; angle measuring means for measuring the relative orientation of said forward and rearward frame members with respect to the rotation axis of the intermediate support wheel; and inclination measuring means for referencing either of the forward and rearward frame members to a reference position which is independent of said forward and rearward frame members.

Also according to the invention, in a method of measuring the profile of a surface wherein a surface profiling apparatus having a forward support wheel, an intermediate support wheel and a rearward support wheel is moved along the surface, the wheels being spaced apart at predetermined distances longitudinally of the direction of travel for travel along substantially the same line, with a forward frame member being supported by the forward and intermediate support wheels and a rearward frame member being supported by the intermediate and rearward support wheels, the forward and rearward frame members being pivotally connected together about the rotation axis of the intermediate support wheel; the steps of measuring the relative orientation of the forward and rearward frame members with respect to the rotation axis of the intermediate support wheel to obtain an orientation value; referencing either of the forward and rearward frame members to a reference position which is independent of the forward and rearward frame members to obtain a reference value; and deriving a corrected value of the reference value as a function of the orientation value.

Further objects and advantages of the invention will become apparent from the description of a preferred embodiment of the invention below.

BRIEF DESCRIPTION OF THE DRAWINGS

The invention will now be described, by way of an example, with reference to the accompanying drawings, in which.

DETAILED DESCRIPTION OF PREFERRED EMBODIMENT

Figure 1:
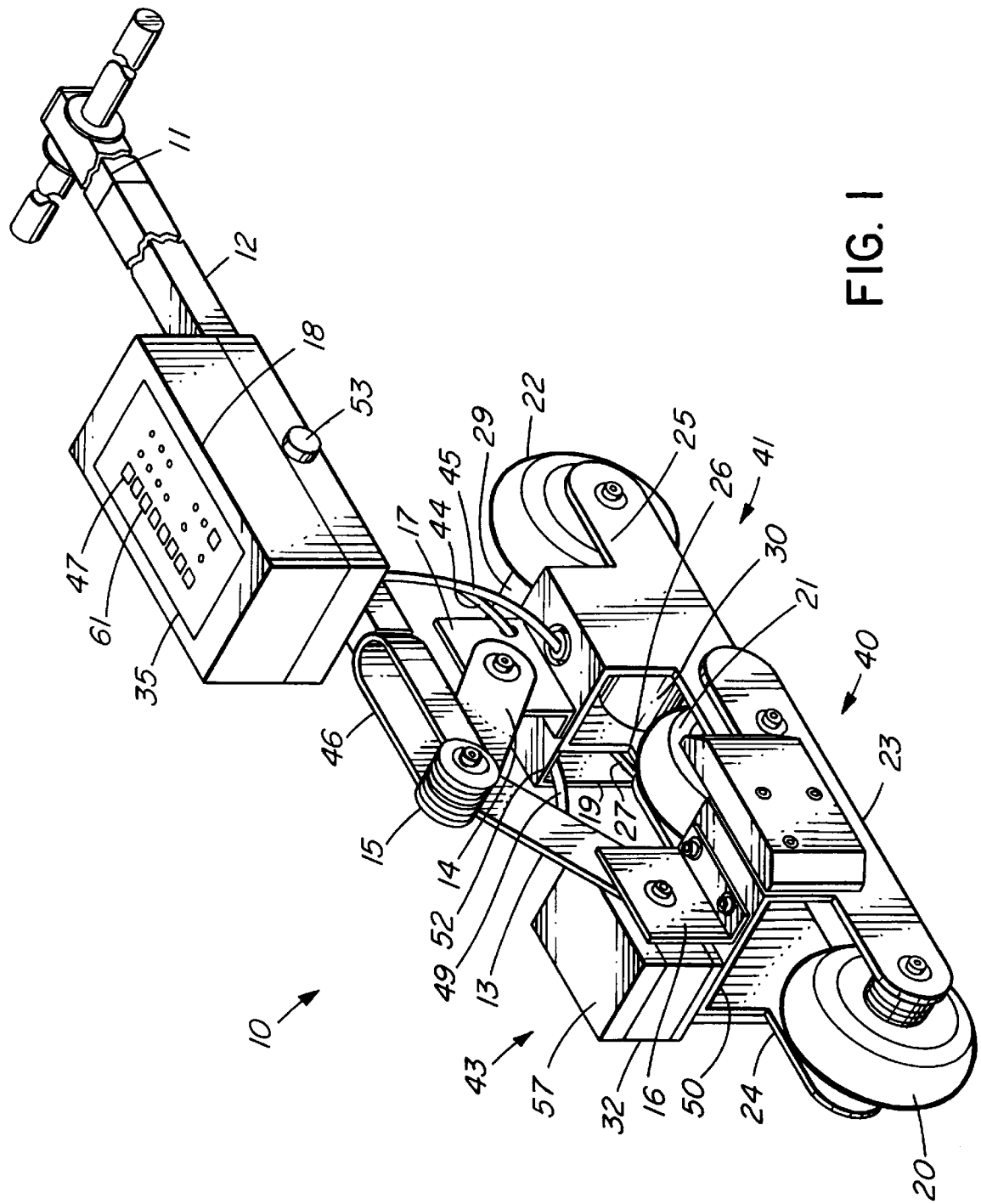
FIG. 1 is an isometric view of a surface profiler according to the invention.
Figure 2:
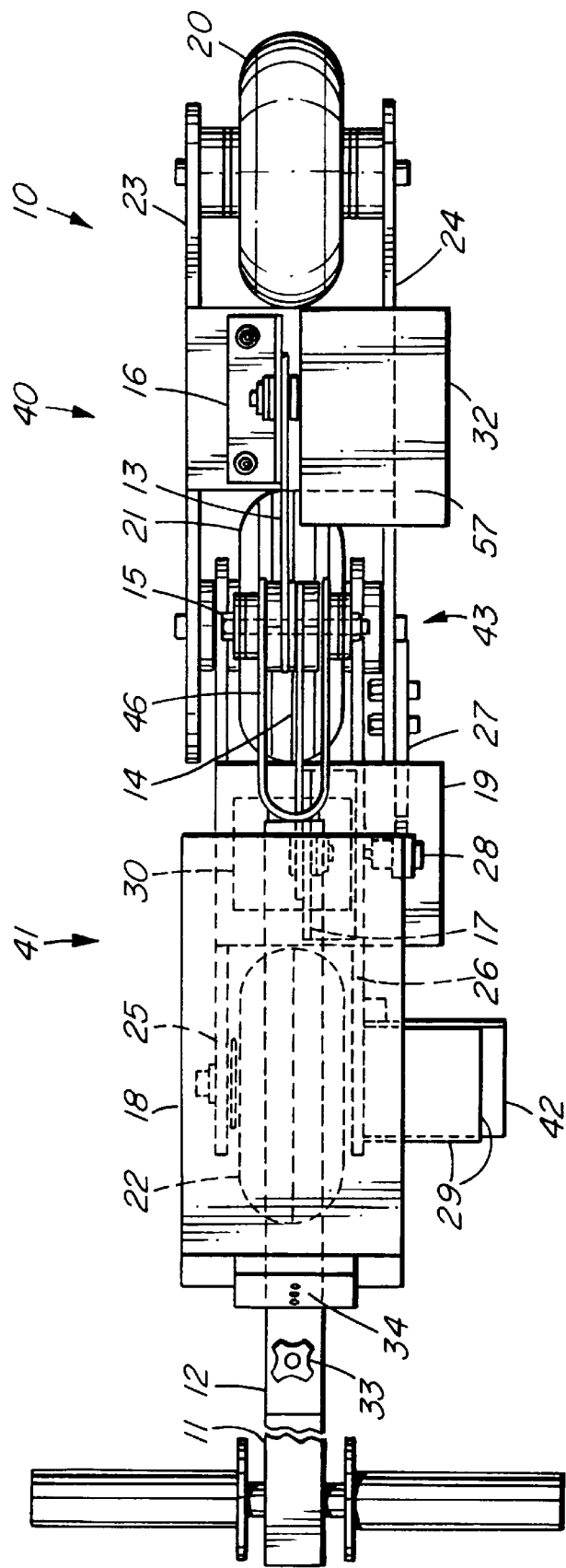
FIG. 2 is a plan view of the profiler of FIG. 1.
Figure 3:
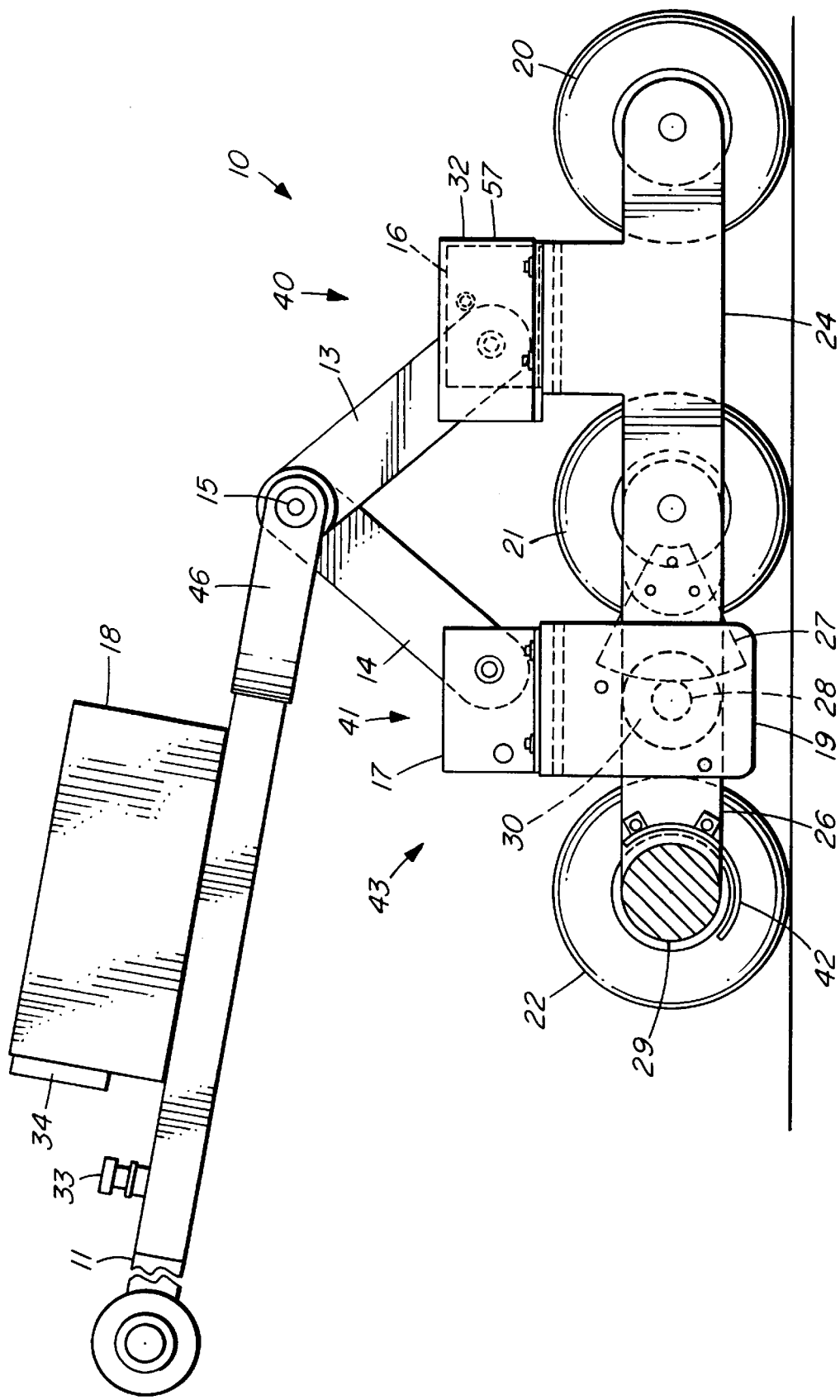
FIG. 3 is an elevation view of the profiler of FIG. 1.

Referring to FIGS. 1 to 3, reference numeral 10 generally indicates a surface profiler having an elongate body 43 which is supported by a forward support wheel 20, an intermediate or center support wheel 21 and a rearward support wheel 22. As can be seen, the wheels 20, 21, 22 are spaced apart longitudinally of the body 43 for travel along the same line.

The body 43 comprises a forward frame member 40, formed by a first pair of arms 23, 24 connected together by a bridge portion 50 straddling the forward and intermediate support wheels 20, 21, and a rearward frame member 41, formed by a second pair of arms 25, 26 connected together by a bridge portion 52 straddling the intermediate and rearward support wheels 21, 22.

The wheels 20, 21, 22 are rotationally supported on axles which are supported between the pairs of arms 23, 24 and 25, 26, respectively. In addition, the forward and rearward frame members 40, 41 are pivotable with respect to each other about the rotation axis of the intermediate support wheel 21. The frame sections 40, 41 are conveniently of aluminum, while the wheels 20, 21, 22 are conveniently of rubber.

In the present embodiment, the distance L between the rotation axes of the forward and intermediate support wheels 20,21, as well as the distance between the rotation axes of the intermediate and rearward support wheels 21,22 is 10 inches (nominally 0.25 m).

Distance measuring means, in the form of an optical encoder 29, is attached to the outer rear end of the arm 26. The rearward wheel 22 translates its rotational motion via a direct coupling to the encoder 29 for generating digital pulses of the distance travelled. A guard collar 42 is provided for protecting the encoder 29 against physical damage.

Angle measuring means, in the form of an optical encoder 30, having a rotating gear 28, is attached to the inner mid-point of the arm 26. A sector gear 27, intermeshing with the gear 28, is attached to the arm 24. The gear 27 translates pivotal movement of the arm 24 relative to the arm 26 to the rotating gear 28 on the encoder 30 for generating digital pulses of the angle of inclination between the arms 24, 26. A guard plate 19 is provided for covering the gears 27, 28. The gears 27, 28 are conveniently of stainless steel.

Horizontal referencing means in the form of an inclinometer 32 is provided in a cabinet 57 on the forward frame member 40 for measuring the angle of inclination of the forward frame member 40 relative to the horizontal position in the direction of travel.

The profiler 10 further comprises upper and lower handle portions 11, 12 which are connected together by means of a hand knob screw 33. The lower handle portion 12 has a fork member 46 which is connected through a bolt and spacers 15 to links 13, 14 which are connected via brackets 16 and 17 to the forward and rearward frame members 40 and 41, respectively. The handle portions 11, 12 are conveniently of aluminum, while the links 13, 14 and brackets 16, 17 are conveniently of steel.

Figure 5:
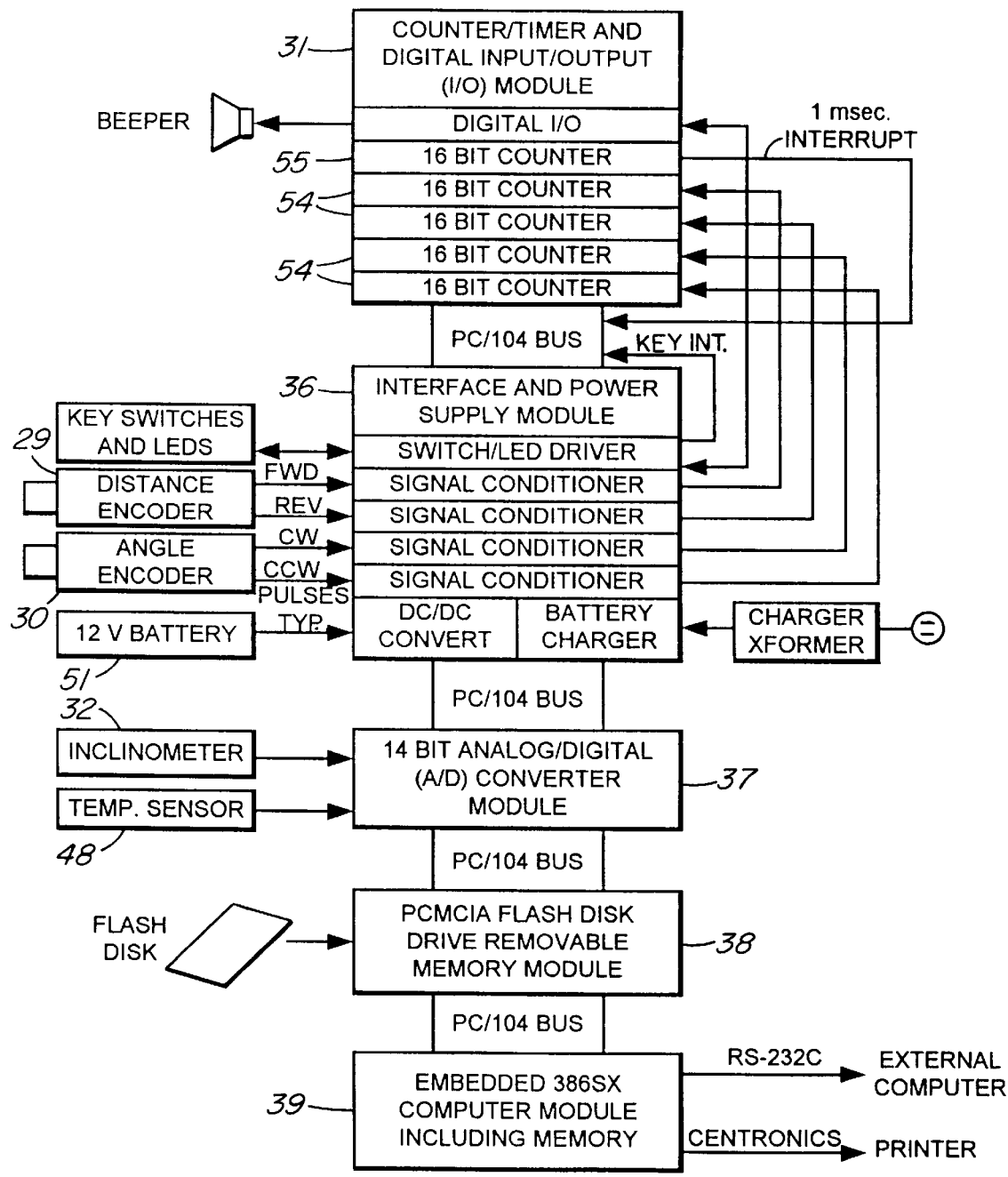
FIG. 5 is a schematic diagram of optical encoder, data processing and control circuits of the profiler of FIG. 1.

A control cabinet 18, which is secured to the lower handle portion 12, is provided for housing the optical encoder, data processing and control circuits of FIG. 5 to record and store angle, inclination and distance measurements. The cabinet 18 also houses a computer with memory in a computer module 39. Connection cables 44, 45 are provided for, respectively, connecting the encoders 29, 30 to the control cabinet 18. A further cable 49 is provided for connecting the inclinometer 32 to the control cabinet 18. The cable 49 is bundled with the cable 44. The cabinet 18 also contains a battery 51. The control cabinet 18 is waterproof and is conveniently of aluminum. It is provided with light emitting diodes 34 which are color coded to indicate the speed of travel of the profiler 10. For example, a green, amber and red LED may be provided, each indicating a different speed or speed range. These speeds or speed ranges may be adjustable to suit the requirements of a particular application. The control cabinet 18 further has a keypad 35 provided with labelled key switches for controlling the operation of the profiler 10. The key switches include a calibration key 47 and a start key 61, the functions of which will be described below. The keypad 35 is covered with a waterproof membrane.

A connection 53 is provided on the control cabinet 18 for connection to an external battery charger for charging the battery 51.

Figure 4:
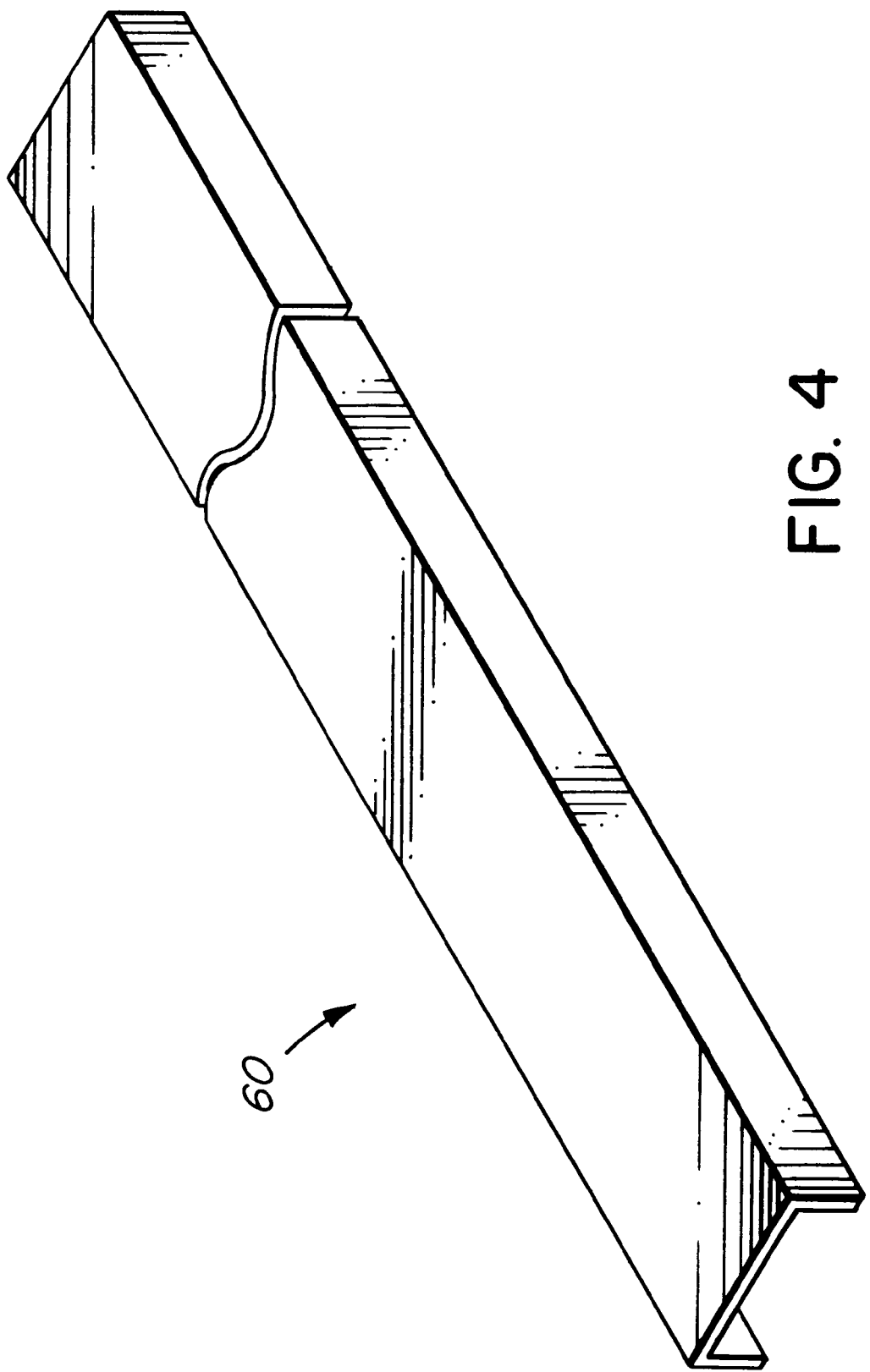
FIG. 4 is an isometric view of a gauging channel for use with the profiler of FIG. 1.

With reference to FIG. 4, a gauging channel 60 is shown which is used for calibrating the profiler 10, as will be described below. As can be seen, it comprises a channel member of U-shaped cross-section which is placed legs down during use, as shown in FIG. 4. The gauging channel 60 is conveniently of aluminum.

Data collection is controlled by the computer in the control cabinet 18 which acquires the data using modules, including a counter/timer with digital input/output (I/O) module 31 and a 14 bit analog to digital (A/D) converter module 37. A temperature sensing probe 48, located in the cabinet 57 containing the inclinometer 32, for sensing ambient temperature is also connected to the converter module 37. Signals are conditioned using an interface and power supply (IPS) module 36 which also carries a DC/DC converter module to convert 12 vDC from the battery to the lower DC voltages required by the computer.

Pulse signals from the distance optical encoder 29 and the angle optical encoder 30 are first conditioned on the IPS module 36 and then go to 16 bit digital counters 54. A fifth digital counter 55 is used to generate a 1 msec interrupt for timing of data acquisition and keyboard displays.

Analog inclinometer and temperature transducer signals are sent directly to the A/D converter module 37. The key switches 47, 61, LEDs 34 and audible beeper are driven from the counter timer and digital I/O module 31 through the IPS module 36. The beeper makes a beeping sound to mark the passing of every L interval, acknowledges keypad button pushes and informs the operator of alarm conditions requiring immediate attention.

The computer in the computer module 39 sends profile data to either an external computer using an RS-232 port or summary results data (graphics and indices) to a printer using a centronics standard or via a flash disk drive module 38 for permanent storage on a flash disk.

OPERATION

The surface profiler 10 is brought on site in one rectangular luggage type case that houses the entire unit and one tube case that houses the gauging channel 60. Using the hand knob screw 33, the upper handle portion 11 is fastened to the lower handle portion 12 which is secured to the profiler body 43.

The surface profiler 10 is first placed on the gauging channel 60 for calibration. The test key 47 on the control cabinet 18 is pressed to establish the zero angle position, based on a straight edge reference provided by the gauging channel 60, for the frame members 40, 41 prior to commencing measuring the profile of a surface. The zero angle position is established by placing the surface profiler 10 on the channel 60 in one direction, recording the angle by pressing the test key 47, then repeating this procedure in the opposite direction.

Next, the surface profiler 10 is pushed by hand to the beginning of an imaginary line along a surface, the profile of which is to be measured. The forward wheel 20 is positioned at a starting point of the line. The start key 61 is pressed to signal the computer circuit to collect data as the profiler 10 is pushed forward along the profile line.

During motion of the profiler 10, the wheels 20, 21 and 22 move up or down successively relative to the change in elevation of the surface. The profiler 10 is held in an upright position during use so that the wheels 20, 21, 22 are in a vertical plane. Digital pulses, representing distance travelled, are generated by the encoder 29. Digital pulses, representing the angle between the arms 24 and 26, are generated by the encoder 30. The inclination relative to horizontal of the forward frame member 40 in the direction of travel is measured by the inclinometer 32. The computer in the computer module 39 correlates the incoming angle and inclination measurement data with corresponding distance travelled measurement data and stores the results.

Profile accuracy is influenced by the rate of data collection. As stated above, the light emitting diodes 34 are color coded to indicate the speed of travel. Thus, the operating speed can be regulated by the operator to achieve the required accuracy of the surface profile and the resultant roughness index values.

In the present embodiment, the computer managing the data acquisition is a microprocessor-based computer, conveniently an embedded Intel 386SX™, which runs a software program written in the C programming language.

A more detailed description of the operation of the profiler 10 now follows.

Distance and angle are both derived from the encoders, 29 and 30 respectively, whose two phase outputs can be separated into forward/reverse distance and clockwise/counter-clockwise angle pulse signals to drive the counters 54 which comprise separate forward/reverse 32 bit distance counters and clockwise/counter-clockwise 32 bit angle counters. In practice, the four individual 32 bit counters 54 are each composed of 16 bit up counting hardware counters and 16 bit up counting software counters which are incremented by the carry bit of the hardware counters. The fifth counter 55 is used to count down a 4 megahertz crystal clock to derive the 1 millisecond interrupt. The one millisecond interrupt interval is conveniently chosen to coordinate in time the acquisition of data from the Counter/Timer & Digital Input/Output Module 31 and the 14 bit A/D Converter Module 37.

Figure 6:
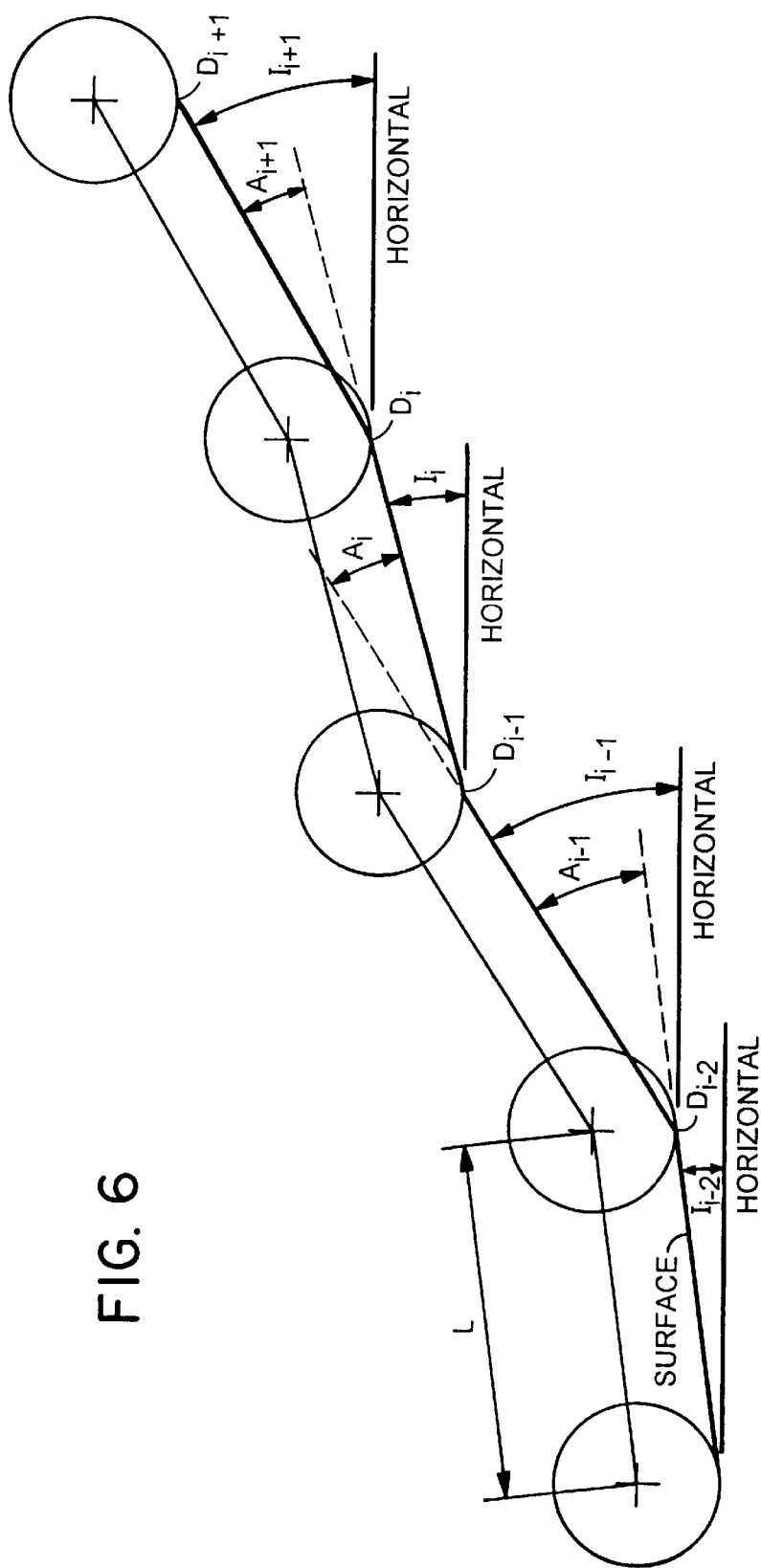
FIG. 6 is a schematic diagram illustrating the method of the invention for measuring and determining the profile of a surface.

Four types of data are acquired at intervals of L=10.00 inches. With reference to FIG. 6, these are:

(i) Distance data: $D_0, D_1, D_2 \ldots D_i \ldots D_n$. The source of distance data is pulses from the distance encoder 29. Counts of distance travelled in the forward direction of travel are derived by subtracting the contents of reverse distance 32 bit counter from that of the forward distance 32 bit counter.

(ii) Inclination data: $I_0, I_1, I_2 \ldots I_i \ldots I_n$. The source of the inclination data is the inclinometer 32. The inclination data consists of binary output from the dual polarity 14 bit binary successive approximation digital to analog converter 37.

(iii) Temperature data: $T_0, T_1, T_2 \ldots T_i \ldots T_n$. The source of temperature data is the temperature sensor 48. The temperature data consists of binary output from the dual polarity 14 bit binary successive approximation digital to analog converter 37.

(iv) Angle data: $A_0, A_1, A_2 \ldots A_i \ldots A_n$. The source of angle data is the angle encoder 30. The angle data consists of counts of counter-clockwise angle derived by subtracting the contents of the clockwise 32 bit counter from that of the counter-clockwise 32 bit counter.

Each of the four types of data $D_i, I_i, A_i$ and $T_i$ are averaged in two different ways. Firstly, the data is averaged by acquiring a moving average group of 256 samples over the preceding 256 milliseconds. Each millisecond the oldest sample is discarded from the sample group while the newest sample is added in. The sum of the sample group is divided by 256. Secondly, the data is averaged by acquiring samples at a multiplicity of points, conveniently 64, uniformly distributed over a 3.2 inch wide region centered on the L intervals. The sum of the sample group is divided by 64.

The $D_i$ distance data is used to determine the L intervals and the points around the intervals where the multiplicity of 64 samples for averaging are acquired. The $D_i$ distance data is also used to determine the velocity for control of the three LEDs 34 for display of profiling speed.

In the following, the subscript j is used to denote distance data recorded at fixed time intervals, whereas i is used to denote distance data recorded at fixed L intervals.

The velocity V is determined by the simple formula:

$$V = D_j - D_{j-1}$$

with time interval from j−1 to j of C tics
where C tics is a conveniently chosen number of 1 millisecond interrupt clock periods or "tics". The $D_i$ distance data is also used to determine the acceleration of the profiler 10 using the formula:

$$Accel = D_{j+1} - 2D_j + D_{j-1}$$

with time interval from j to j+1 of C tics

The acceleration is used to compensate for longitudinal (along the path of travel) acceleration influence of the gravitational acceleration referenced inclinometer 32 for every sample acquired at L intervals.

$$I_{i(corrected)} = I_i - K_A \text{Accel}$$

where $K_A$ is a scaling factor, empirically derived, which provides the correct amount of compensation. In practice the phase of the acceleration compensation signal must also be adjusted to provide the correct amount of phase lead or lag to match the longitudinal acceleration component of the inclinometer signal.

The $I_i$ inclination data is used to derive the basic profile shape according to the accumulated elevation formula:

$$E_n = L \sum_{i=0}^{n} \sin(K_I I_{i(corrected)})$$

where $K_I$ is a scaling factor to convert from raw data counts to degrees or radians as may be required. In practice the selected transducer provides the sine linearization such that this trigonometric function does not need to be performed by the computer.

The $T_i$ temperature data is used to temperature compensate the inclinometer 32 whose bias and scale factor temperature coefficients of correction are known and provided by the manufacturer.

Smoothing of Inclinometer Data Using Angle Data

The $A_i$ angle data is used to correct random error in the data acquired by the inclinometer 32. The data acquired by the gravitation acceleration referenced inclinometer 32 maintains reference to true vertical (and consequently true horizontal) using a pendulum which is magnetically stabilized. The current required to drive the magnetic stabilizing coil is sinusoidally related to the angle of inclination. The random error arises from vibration of the profiler 10 and inclinometer 32 and residual longitudinal acceleration of the inclinometer 32 arising from imperfections of the acceleration compensation. The data collected by the angle encoder 30, while being a relative rather than an absolute measure to a known benchmark such as true horizontal, is entirely insensitive to longitudinal acceleration. The inclinometer data has been shown in practise to contain greater amounts of error at higher speed of operation arising from increasing vibration and acceleration influence, whereas the angle encoder 30 provides highly reproducible data independent of speed of operation within the normal range of walking speeds. A profile produced using the angle encoder 30 alone will be derived by summing all of the acquired angles with the resulting accumulating error causing the profile to tend to drift off of the correct profile. By this preferred method, the angle data is used to correct errors in the inclinometer data such that the profile acquired through the use of the two instruments is more accurate than either instrument is capable of independently providing.

The error in the inclinometer signal has systematic and random components. The systematic component arises primarily from an offset $e_{of}$ of the zero the instrument due to mechanical, temperature and electronic influences. In practice the offset error of the inclinometer 32 is not a serious problem in that it results in a small tilt of the profile which does not influence the calculation of commonly used roughness indices such as the International Roughness Index (IRI). The inclinometer offset error $e_{of}$ can be reduced to very near zero using the calibration procedure described below. Also, the amount of the residual systematic error can be determined by profiling a closed loop and determining the elevation difference at the closure point. This amount of error can be compensated by addition of a constant correction angle to all $I_i$ such that the offset error is reduced to zero. The random error component $e_i$ must be compensated by other means. The angle data has been shown to be appropriate for the correction, or smoothing, of the inclinometer data as shall be shown below to reduce random error. The relationship between inclinometer and angle data for sequential measurements can be shown to be:

$$I_{i-1}+A_i=I_i$$

$$I_i+A_{i+1}=I_{i+1}$$

For simplification, the $I_i$ in the description below is assumed to be already corrected for acceleration, as described above.

Assume that the sample $I_i$ has an error component $e_i$ added due to vibration or acceleration of the inclinometer 32. Further assume for the moment that samples $I_{i-1}$ and $I_{i+1}$ do not also contain error. $e_1$ and $e_2$ are the values of $e_i$ with the profiler 10 in the two positions associated with $A_i$ and $A_{i+1}$, respectively.

$$I_{i-1}+A_i=I_i+e_1$$

$$I_i+e_2+A_{i+1}=I_{i+1}$$

solving for $e_1$ and $e_2$:

$$e_1=I_{i-1}+A_i-I_i$$

$$e_2=I_{i+1}-A_{i+1}-I_i$$

The error $e_i$ may be calculated as the average of $e_1$ and $e_2$:

$$e_i=(I_{i-1}+I_{i+1}-2I_i+A_i-A_{i+1})/2$$

This formula uses the difference $A_i-A_{i+1}$ which eliminates offset error in the angle data.

The $I_i$ data can now be smoothed by making S smoothing passes (for i=0 to n) of the $I_i$ data using the formula:

$$I_{i(corrected)}=I_{i(uncorrected)}-(e_i/S)$$

The smoothing process recognizes that all $I_i$ may contain error. Only very small adjustments are made on each pass, rather than large adjustments on any one pass, such that the optimum amount of smoothing occurs over the entire profile. At the end of the smoothing process the data can be examined to confirm that $A_i=I_i-I_{i-1}$. In a physical sense the profile will have correct long wave features provided primarily by the corrected inclinometer data and correct short wave features provided primarily by the angle data.

The smoothing process may be improved by applying correction only when $e_i$ and $e_{i+1}$ have the same polarity. Alternatively the polarities and magnitudes of $e_i$ over a region of i±5 to 10 may be examined for more optimal error correction.

Calibration of Inclinometer and Angle Encoder Using Calibrating Channel

The calibration is accomplished using the gauging channel 60, which in the present embodiment is a precision machined aluminum channel. The inclinometer 32 is assumed to have a fixed offset error of $e_o$. The channel 60 is placed on approximately level ground so that it does not rock back and forth. The slope of the channel 60 relative to true horizontal has an error of $e_c$. First the profiler 10 is placed on the channel 60 in one direction and the calibration key 47 is pushed on the control cabinet 18 while the inclinometer 32 reads:

$$C_1=e_o+e_c.$$

Then the profiler 10 is placed on the channel 60 in the opposite direction (rotated 180°) and the calibration key 47 is again pushed while the inclinometer 32 reads:

$$C_2=e_o-e_c.$$

The inclinometer correction then is:

$$e_o=(C_1+C_2)/2$$

The angle encoder counters need to be zeroed when the three wheels 20,21,22 are perfectly in line. When the calibration key 47 is pushed the second time the angle encoder counters are set to zero while the profiler 10 is aligned with the straight edge surface provided by the channel 60.

The profiler 10 can be operated in two different modes, i.e. a rolling mode, in which the profiler 10 is pushed along continuously during a profiling operation, and a stop-and-go mode in which the profiler 10 is stopped when measurements are made.

In the rolling mode the beeper will beep when each distance data point $D_i$ has been reached and inclination ($I_i$), angle ($A_i$) and temperature ($T_i$) data recorded.

In the stop-and-go mode, the LED's 34 are used to indicate when measurements are to be taken, instead of indicating speed as in the rolling mode. For example, when a measurement is to be taken (i.e. a distance data point $D_i$ is reached), the green LED is activated. The amber LED indicates that the profiler 10 is still short of the interval L and the red LED is activated if the profiler 10 overshoots a distance data point $D_i$.

The roundness of the wheels 20, 21, 22 can be monitored by rolling the profiler 10 back and forth on the gauging channel 60. A LED is provided on the control cabinet 18 which is activated if the wheels 20, 21, 22 on the channel 60 are out of alignment by more than a few microns of elevation. The cause of such inalignment is primarily wheel roundness.

The profiler 10 also has the capability of automatically computing values of the International Roughness Index (IRI), the Root Mean Square Vertical Acceleration (RMSVA) with derivative Present Serviceability Index (PSI) and the California Profilograph Index (CPI) after converting true profile data to California Profilograph data.

While only a preferred embodiment of the invention has been described herein in detail, the invention is not limited thereby and modifications can be made within the scope of the attached claims.

What is claimed is:

1. Surface profiling apparatus having a forward support wheel, an intermediate support wheel and a rearward support wheel for travelling along a surface the profile of which is to be measured, said wheels being spaced apart at predetermined distances longitudinally of the direction of travel for travel along substantially the same line along said surface, and further comprising:

a forward frame member supported by said forward and intermediate support wheels;

a rearward frame member supported by said intermediate and rearward support wheels, the forward and rearward frame members being pivotally connected together about the rotation axis of said intermediate support wheel;

angle measuring means for measuring the relative orientation of said forward and rearward frame members with respect to the rotation axis of the intermediate support wheel to obtain an orientation value;

inclination measuring means for referencing either of the forward and rearward frame members to a reference position which is independent of said forward and rearward frame members to obtain a reference value; and means for deriving a corrected value of the reference value as a function of the orientation value.

2. The surface profiling apparatus according to claim 1, wherein said reference position is the horizontal position.

3. The surface profiling apparatus according to claim 2, wherein said inclination measuring means comprises an inclinometer which is located on said forward frame member for measuring the orientation of the forward frame member with respect to the horizontal position.

4. The surface profiling apparatus according to claim 1, wherein said angle measuring means is adapted to measure an angle of inclination between reference axes on the forward and rearward frame members, respectively.

5. The surface profiling apparatus according to claim 1, further comprising distance measuring means for determining distance travelled by one of said support wheels and wherein said angle measuring means measures said relative orientation and said inclination measuring means references said frame member, responsive to said distance measuring means, at successive intervals substantially equal to the spacing between adjacent ones of said support wheels.

6. The surface profiling apparatus according to claim 5, further comprising acceleration deriving means on the apparatus for measuring acceleration of the apparatus during travel along said surface.

7. The surface profiling apparatus according to claim 1, further comprising means for measuring ambient air temperature.

8. The surface profiling apparatus according to claim 1, further comprising a handle extending rearwardly of the apparatus for pushing the apparatus along said surface.

9. The profiling apparatus according to claim 1, further comprising means for establishing an angle of reference for said angle measuring means.

10. The profiling apparatus according to claim 1, further comprising means for indicating the speed of travel of the apparatus along said surface.

11. The profiling apparatus according to claim 1, further comprising gear means between said forward and rearward frame members, which gear means is coupled to said angle measuring means for increasing the sensitivity of the angle measuring means.

12. The profiling apparatus according to claim 8, wherein said handle is pivotally connected to both said forward and rearward frame members.

13. In a method of measuring the profile of a surface wherein a surface profiling apparatus having a forward support wheel, an intermediate support wheel and a rearward support wheel is moved along the surface, the wheels being spaced apart at predetermined distances longitudinally of the direction of travel for travel along substantially the same line, with a forward frame member being supported by the forward and intermediate support wheels and a rearward frame member being supported by the intermediate and rearward support wheels, the forward and rearward frame members being pivotally connected together about the rotation axis of the intermediate support wheel; the steps of:

measuring the relative orientation of the forward and rearward frame members with respect to the rotation axis of the intermediate support wheel to obtain an orientation value;

referencing either of the forward and rearward frame members to a reference position which is independent of the forward and rearward frame members to obtain a reference value; and deriving a corrected value of the reference value as a function of the orientation value.

14. The method according to claim 13, wherein said measuring of the relative orientation and said referencing to a reference position is effected at target points spaced at successive intervals along the surface substantially equal to the spacing between adjacent ones of the support wheels of the profiling apparatus in order to obtain a set of corrected reference values and deriving a profile of the surface from the corrected reference values.

15. The method according to claim 14, further comprising the steps of:

measuring the relative orientation of the forward and rearward frame members and referencing either of the forward and rearward frame members to a reference position at a plurality of sample points around each target point to obtain a set of sample orientation values and a set of sample reference values; and averaging the set of sample orientation values and the set of sample reference values to obtain resultant orientation and reference values for deriving said corrected reference values.

16. The method according to claim 13, wherein said measuring of the orientation of the forward and rearward frame members with respect to the rotation axis of the intermediate support wheel comprises measuring the angle of inclination between reference axes on the forward and rearward members, respectively.

17. The method according to claim 13, wherein said reference position is the horizontal position.

18. The method according to claim 17, wherein said referencing is effected by means of an inclinometer and further comprising the step of measuring acceleration of the profiling apparatus and correcting the reference value responsive to the acceleration, prior to deriving said corrected value of the reference value.

* * * * *